(12) United States Patent
Zhang

(10) Patent No.: US 9,065,734 B2
(45) Date of Patent: Jun. 23, 2015

(54) NETWORK BANDWIDTH ALLOCATION IN MULTI-TENANCY CLOUD COMPUTING NETWORKS

(71) Applicant: Telefonaktiebolaget L M Ericsson (publ), Stockholm (SE)

(72) Inventor: Ying Zhang, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 239 days.

(21) Appl. No.: 13/791,316

(22) Filed: Mar. 8, 2013

(65) Prior Publication Data
US 2014/0258535 A1 Sep. 11, 2014

(51) Int. Cl.
| G06F 15/173 | (2006.01) |
| H04L 12/24 | (2006.01) |
| G06F 9/50 | (2006.01) |
| H04L 12/801 | (2013.01) |
| H04L 12/753 | (2013.01) |
| H04L 29/08 | (2006.01) |

(52) U.S. Cl.
CPC .......... *H04L 41/0806* (2013.01); *H04L 41/142* (2013.01); *G06F 9/5072* (2013.01); *G06F 9/5077* (2013.01); *H04L 41/0896* (2013.01); *H04L 47/10* (2013.01); *H04L 45/48* (2013.01); *H04L 41/5096* (2013.01); *H04L 67/10* (2013.01)

(58) Field of Classification Search
CPC ....... H04L 45/12; H04L 45/22; H04L 45/125; H04L 41/0806; H04L 12/24; H05Q 3/66
USPC ................. 709/238, 239, 241; 370/238, 351; 379/221.01, 239
See application file for complete search history.

(56) References Cited

U.S. PATENT DOCUMENTS

| 6,104,701 A * | 8/2000 | Avargues et al. ............. 370/238 |
| 6,721,275 B1 * | 4/2004 | Rodeheffer et al. .......... 370/238 |
| 7,886,183 B2 | 2/2011 | Krishnan et al. |
| 2006/0203745 A1 * | 9/2006 | Acharya et al. ............... 370/254 |
| 2011/0142053 A1 | 6/2011 | Van Der Merwe et al. |
| 2013/0014101 A1 | 1/2013 | Ballani et al. |
| 2013/0031559 A1 | 1/2013 | Alicherry |
| 2013/0275974 A1 | 10/2013 | Cao et al. |

OTHER PUBLICATIONS

Notice of Allowance, U.S. Appl. No. 13/663,416, dated May 30, 2014, 17 pages.

(Continued)

*Primary Examiner* — Frantz Jean
(74) *Attorney, Agent, or Firm* — Nicholson De Vos Webster & Elliott LLP

(57) ABSTRACT

A computing device determines an optimal allocation of network bandwidth on a plurality of communications links for a plurality of virtual machines (VMs) in a multi-tenant cloud network based upon a set of bandwidth requirements for the plurality of VMs. The computing device generates a plurality of spanning tree data structures (TDSs). Edges in the TDSs include computed bandwidth values indicating an amount of bandwidth to be reserved over a communications link represented by that edge for the plurality of VMs. The computing device generates a weighted distance value for each TDS of the plurality of TDSs, and selects a TDS of the plurality of TDSs having a smallest weighted distance value as the TDS having computed bandwidth values representing the optimal allocation of network bandwidth.

20 Claims, 8 Drawing Sheets

(56) References Cited

OTHER PUBLICATIONS

Kumar Das, Subir et al., "Weight Based Multicast Routing Protocol for Ad hoc Wireless Networks", Nov. 17, 2002, 5 pages, IEEE.

Zhang, Ying, "A Method and System to Allocate Bandwidth for Heterogeneous Bandwidth Request in Cloud Computing Networks", Corresponding to U.S. Appl. No. 13/851,694, filed Mar. 27, 2013, 27 pages.

Zhang, Ying, et al., "A Method and System to Allocate Bandwidth in Cloud Computing Networks", corresponding to U.S. Appl. No. 13/663,416, filed Oct. 29, 2012 21 pages.

Zhu, Jing, et al., "Towards Bandwidth Guarantee in Multi-tenancy Cloud Computing Networks", Oct. 30, 2012, 10 pages.

Al-Fares, Mohammad, et al., "A Scalable, Commodity Data Center Network Architecture", Aug. 2008, 12 pages, SIGCOMM' 08, ACM 978-1-60558-175-0/08/08, Seattle, Washington, USA.

Ballani, Hitesh, et al., "Towards Predictable Datacenter Networks", Aug. 15-19, 2011, 12 pages, SIGCOMM'11, Toronto, Ontario, Canada.

Crowcroft, Jon, et al., "Differentiated End-to-End Internet Services Using a Weighted Proportional Fair Sharing TCP", Jun. 30, 1998, 17 pages.

Guo, Chuanxiong, et al., "BCube: A High Performance, Server-centric Network Architecture for Modular Data Centers", Aug. 2009, 12 pages, SIGCOMM'09, ACM 978-1-60558-954-9/09/08, Barcelona, Spain.

Guo, Chuanxiong, et al., "SecondNet: A Data Center Network Virtualization Architecture with Bandwidth Guarantees", Nov. 30-Dec. 3, 2010, 12 pages, ACM CoNEXT 2010, Philadelphia, USA.

Pan, Rong, et al., "QCN: Quantized Congestion Notification", 2007, 26 pages.

Shieh, Alan, et al., "Sharing the Data Center Network", 2011, 14 pages.

Notice of Allowance, U.S. Appl. No. 13/663,416, dated Sep. 8, 2014, 6 pages.

Dinan, James et al., "Efficient Multithreaded Context ID Allocation in MPI", Sep. 23, 2012, 10 pages.

Gurusamy, Mohan et al., "An Integrated Resource Allocation Scheme for Multi-Tenant Data-center", Oct. 22, 2012, 9 pages, 37th Annual IEEE Conference on Local Computer Networks, LCN 2012, Clearwater, Florida.

\* cited by examiner

NETWORK BANDWIDTH ALLOCATION IN MULTI-TENANCY CLOUD COMPUTING NETWORKS

FIELD

Embodiments of the invention relate to the field of computer networking; and more specifically, to methods and systems for network bandwidth allocation in multi-tenancy cloud computing networks.

BACKGROUND

The rise of cloud computing in recent years has transformed the way computing applications are created and executed. Most cloud computing providers employ an Infrastructure-as-a-Service (IaaS) model in which customers outsource their computing and software capabilities to third party infrastructures and pay for the service usage on demand, which allows customers to establish and rapidly expand a global presence in minutes rather than days or months. By offering virtually unlimited resources without any upfront capital investment and a simple pay-as-you-go charging model, cloud computing provides a compelling alternative to the construction, hosting, and maintenance of private computing infrastructures.

Despite the tremendous momentum of cloud computing, many companies are still reluctant to move their services or enterprise applications to the cloud, due to reliability, performance, security, and privacy concerns. To maximize economic benefits and resource utilization, cloud networks typically simultaneously initiate multiple virtual machines (VMs) to execute on one physical server computing device. Further, most cloud providers only use host based virtualization technologies to realize separation and performance isolation between VMs on the end-host level. Then, in the network that interconnects each host, the same set of physical routers and links are deployed to carry traffic for all tenants indistinguishably. Further, the cloud providers do not offer guaranteed network resources to tenants, and thus the bandwidth between VMs of the same tenant can vary significantly over time, depending on the network load and usage from other tenants.

Moreover, while cloud computing data centers provide many mechanisms to schedule local compute, memory, and disk resources, existing mechanisms for apportioning network resources fall short. Unfortunately, today's public cloud platforms—such as Amazon's Elastic Compute Cloud (EC2), Google's Google App Engine, Microsoft's Azure Service Platform, Rackspace's Mosso, and GoGrid's cloud hosting platform—do not provide any network performance guarantees, which in turn affects application reliability and tenant cost. Specifically, the resource reservation model in today's clouds only provisions processor (e.g., Central Processing Unit (CPU)) and memory resources but ignores networking completely. Because of the largely oversubscribed nature of today's datacenter networks, network bandwidth is a scarce resource shared across many tenants. When network-intensive phases of multiple applications simultaneously occur and compete for these scarce network resources, their running times become unpredictable. This uncertainty in execution time further translates into unpredictable cost as tenants need to pay for reserved VMs for the entire duration of their jobs. Accordingly, there exists a need for systems and mechanisms to provide network bandwidth allocation and guarantees in multi-tenant cloud networks.

SUMMARY

According to an embodiment of the invention, a computing device performs a method for determining an optimal allocation of network bandwidth on a plurality of communications links for connecting a plurality of virtual machines (VMs) of a tenant in a multi-tenant cloud network. The determination is based upon a set of bandwidth requirements for the plurality of VMs. The method includes generating a plurality of tree data structures (TDSs). Each TDS of the plurality of TDSs includes a plurality of nodes representing both the plurality of VMs and a plurality of network devices that forward traffic in the multi-tenant cloud network. Each TDS of the plurality of TDSs further includes a plurality of edges representing at least some of the plurality of communications links. Each edge of the plurality of edges includes a computed bandwidth value indicating an amount of bandwidth to be reserved over the communications link represented by the edge for the plurality of VMs of the tenant. The computed bandwidth value is based upon the set of bandwidth requirements. The method further includes generating a weighted distance value for each TDS of the plurality of TDSs. The generating of the weighted distance value is based upon distances in the TDS between the root node and each other node representing a VM, and also based upon the computed bandwidth values in the TDS between the root node and each other node representing a VM. The method further includes selecting the TDS of the plurality of TDSs having a smallest weighted distance value as the TDS having computed bandwidth values representing the optimal allocation of network bandwidth.

According to an embodiment of the invention, a server end station determines an optimal allocation of network bandwidth on a plurality of communications links for connecting a plurality of virtual machines (VMs) for a tenant in a multi-tenant cloud network based upon a set of bandwidth requirements for the plurality of VMs. The server end station includes a set of one or more processors and a tree data structure (TDS) generation module coupled to the set of processors. The TDS generation module is and configured to generate a plurality of TDSs. Each TDS of the plurality of TDSs is to include a plurality of nodes representing both the plurality of VMs and a plurality of network devices that forward traffic in the multi-tenant cloud network. Each TDS of the plurality of TDSs is further to include a plurality of edges representing at least some of the plurality of communications links. Each edge of the plurality of edges is to include a computed bandwidth value indicating an amount of bandwidth to be reserved over the communications link represented by the edge for the plurality of VMs of the tenant. The computed bandwidth value is to be based upon the set of bandwidth requirements. The TDS generation module is further configured to generate a weighted distance value for each TDS of the plurality of TDSs based upon distances in the TDS between the root node and each other node representing a VM, as also based upon the computed bandwidth values in the TDS between the root node and each other node representing a VM. The server end station also includes a TDS selection module coupled to the set of processors. The TDS selection module is configured to select the TDS of the plurality of TDSs having a smallest weighted distance value as the TDS having computed bandwidth values representing the optimal allocation of network bandwidth.

According to an embodiment of the invention, a computer-readable storage medium provides instructions which, when executed by a set of one or more processors of a computing device, cause the computing device to determine an optimal allocation of network bandwidth on a plurality of communications links for connecting a plurality of virtual machines (VMs) of a tenant in a multi-tenant cloud network. This determining is based upon a set of bandwidth requirements for the plurality of VMs. The computing device generates a plurality of tree data structures (TDSs). Each TDS of the plurality of TDSs includes a plurality of nodes representing both the plurality of VMs and a plurality of network devices that forward traffic in the multi-tenant cloud network. Each TDS of the plurality of TDSs further includes a plurality of edges representing at least some of the plurality of communications links. Each edge of the plurality of edges includes a computed bandwidth value indicating an amount of bandwidth to be reserved over the communications link represented by the edge for the plurality of VMs of the tenant. The computed bandwidth value is based upon the set of bandwidth requirements. The computing device also generates a weighted distance value for each TDS of the plurality of TDSs based upon distances in the TDS between the root node and each other node representing a VM, and the computed bandwidth values in the TDS between the root node and each other node representing a VM. The computing device also selects the TDS of the plurality of TDSs having a smallest weighted distance value as the TDS having computed bandwidth values representing the optimal allocation of network bandwidth.

Embodiments of the invention allow for the programmatic determination of the network bandwidth amounts to be reserved within a multi-tenant cloud network to optimally provide bandwidth guarantees to its tenants with the smallest amount of required reserved bandwidth. Embodiments allow for bandwidth requirements to be specified using a simple notation and easily changed in real time with existing VMs. Further, embodiments of the invention allow VMs to be placed in any location in the cloud network, and an optimal solution given that topography can be determined.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
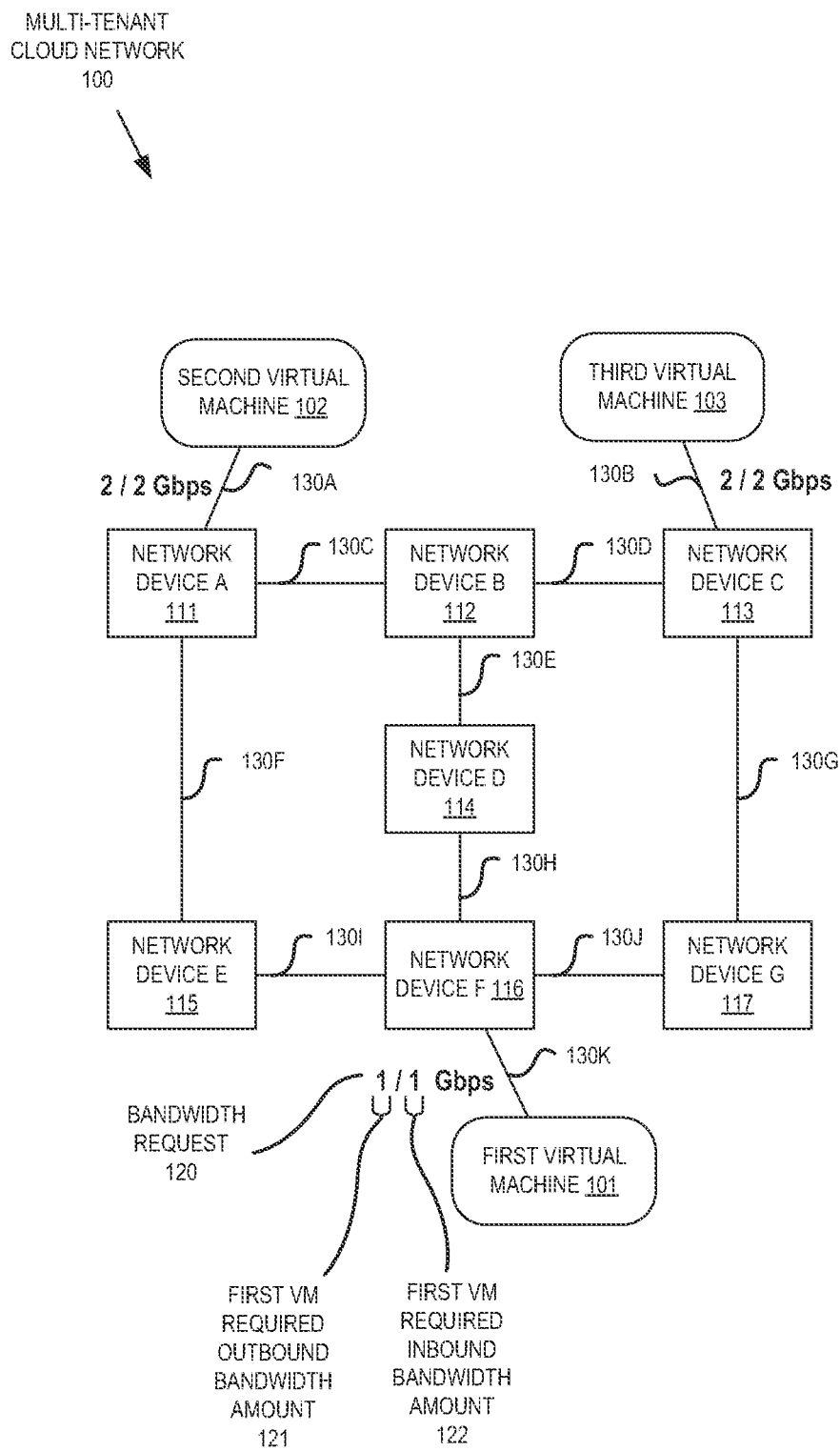
FIG. 1 illustrates an example cloud computing network topology including virtual machines and stipulated bandwidth requirements according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Bracketed text and blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention.

An electronic device or computing device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, tablets, palm tops, mobile phones, smartphones, multimedia phones, Voice Over Internet Protocol (VOIP) phones, user equipment, terminals, portable media players, GPS units, gaming systems, set-top boxes) are computing devices, typically operated by users, that access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Cloud computing is generally defined as a computing capability that provides an abstraction between the computing resource and its underlying physical architecture (e.g., server computing systems, storage devices and systems, networks), enabling convenient, on-demand network access to a shared pool of configurable computing resources that can be rapidly provisioned and released with minimal management effort or service provider interaction. Resources provided by cloud computing providers may be said to be "in a cloud." Cloud-resident elements may include, without limitation, storage devices, servers, databases, computing environments (including virtual machines and desktops), networks, and applications. In some settings, Internet-based applications, which are sometimes provided under a "software-as-a-service" (SAAS) model, may be referred to as cloud-based resources.

Cloud computing operators, or cloud operators, typically offer cloud services to many tenants. A tenant, for the purposes of this disclosure, is best understood as a person or organization that has requested cloud-based resources from the cloud operator. In some embodiments, the tenant may request and manage cloud-based resources from a cloud provider using a subscriber end station or computing device.

It is critical for cloud operators to deploy efficient network resource allocation and isolation techniques, for isolating performance among tenants, minimizing disruption, as well as preventing malicious denial of service (DoS) attacks. A good solution for network resource allocation should satisfy at least three requirements. First, it should allow tenants to specify the demand of their applications in an intuitive way and support flexible updates. More specifically, on one hand, a system should maintain the simplicity of the interface between tenants and providers for configuring different services, but on the other hand, should allow tenants to specify various types of demand requirements. Second, the provider should still be able to leverage the advantage of multiplexing to support many virtual networks on their physical network. The greater the amount of sharing, the more tenants the cloud provider may serve, and thus potentially the more revenue the cloud provider will acquire. Third, the allocation system should scale with the size of the tenant. With every new tenant, the system should be able to compute the best bandwidth reservation and setup the corresponding explicit routing in a quick and efficient manner.

In most current cloud services, such as Amazon EC2, network bandwidths allocated to multiple tenants depend on the Transmission Control Protocol (TCP) based competition among the tenants. However, this can lead to a vulnerability to DoS attacks.

Embodiments of the invention address the problem of a lack of networking service-level agreements (SLAs) in cloud computing environments. Embodiments of the invention provide optimal methods to provision cloud computing networks so that new network abstractions specified by tenants can be met by the cloud network. Using the new network abstractions, tenants can specify their networking resource requirements along with their CPU and memory needs, so their applications can obtain predictable performance with respect to computation, memory use, as well as network use. In an embodiment, the new network abstractions model bandwidth abstractions using a virtual cluster (VC) model where all virtual machines (VMs) are connected to a virtual switch with links requiring a bandwidth B.

In embodiments of the invention, the system does not assume that VMs may only be placed in a limited set of locations (i.e., executed on particular host computing systems/devices) in the data center. Rather, embodiments of the invention allow VMs to be stipulated to be placed in particular locations—perhaps according to their requirements of CPU, memory, disk, or other dependencies—and allows for and optimal provisioning of network resources of the cloud network, given the stipulated VM locations, in order to meet the bandwidth requirements of these tenants. Accordingly, embodiments of the invention allow for dynamic network provisioning, enabling bandwidth assignments to be adjusted in real time based upon network conditions and the set of VMs in the network. Further, embodiments of the invention allow for each VM for a tenant to have different bandwidth requirements, and in certain embodiments, the bandwidth requirements for one or more of the VMs may include a different (or same) uplink and downlink bandwidth requirement.

In an embodiment of the invention, a network resource abstraction model is utilized to represent the requirements and actors in a cloud network where a cloud provider offers virtual network services to customers for inter-connecting VMs assigned to these customers. The customers do not need to be aware of the underlying physical infrastructure of the cloud network, but instead agree upon high-level service level agreements (SLAs) that stipulate what levels of service they will be entitled to. To this end, each tenant can specify her requirement of the network service in terms of topology connectivity, security policy, required bandwidth, etc.

In particular, in this virtual network service model, the tenant specifies the corresponding bandwidth demand for each $VM_i$ as $B_i$ ($0 \le i < N$, where N is the total number of VMs requested by the tenant). In an embodiment of the invention, the virtual network service model utilizes a "hose" model of bandwidth request, where each $B_i$ stipulates a maximum total amount of bandwidth that that particular VM will send into the network at any one time and/or receive from the network at any one time. However, in other embodiments other bandwidth modules may be utilized, such as by defining bandwidth requirements (e.g., maximum required bandwidth, minimum required bandwidth) between particular pairs or groups of VMs.

Given the bandwidth request of $<B_0; B_1; \ldots; B_{N-1}>$ from a tenant request, the model in an embodiment operates under the assumption that the tenant is requesting a non-blocking virtual network infrastructure to provide the network service, i.e., there should be no oversubscription in the virtual network allocated to the tenant. While this assumption requires more network resources from cloud providers, this configuration offers better service to the tenants as it simulates a scenario where all the VMs are connected to a non-blocking virtual switch. However, it would be well known to those in the art that this model can be easily extended to a virtual network service that allows oversubscription.

This abstraction model provides many advantages. First, the model provides an ease of specification, as only one inward and outward rate (possibly asymmetric) per VM needs to be specified. Second, the model provides flexibility as data to and from a given VM can be distributed arbitrarily over other endpoints provided the aggregate conforms to the VM roles. Third, the model allows for multiplexing gain as, due to statistical multiplexing gain, VM rates can be less than the aggregate rate required for a set of VM pairs. Also, the model allows for ease of characterization as "hose" requirements are easier to characterize because the statistical variability in the individual source-destination traffic is smoothed by aggregation.

Given the network service abstraction model, embodiments of the invention construct a plurality of spanning trees including nodes representing the network devices and VM locations in a network. Each edge of the trees, which represents a communications link, is associated with a computed bandwidth value representing a minimal amount of bandwidth that must be reserved on that link. The computed bandwidth value is determined based upon the inbound and outbound bandwidth requirements of the VMs by analyzing the amount of bandwidth that could potentially flow through that communications link. Each of the plurality of spanning trees includes a different node as the root node, and each tree is constructed such that the sum of computed bandwidth amounts for that tree is minimized. A weighted distance value for each tree is calculated based upon the computed bandwidth amounts and the distances between each of the VMs in the tree. The tree having a minimum weighted distance value is selected as the tree having computed bandwidth amounts that optimally represent a minimal network bandwidth allocation (and the forwarding paths) in the multi-tenant cloud network for the VMs belonging to that tenant.

FIG. 1 illustrates an example cloud computing network topology including virtual machines and stipulated bandwidth requirements according to one embodiment of the invention. FIG. 1 includes a multi-tenant cloud network 100 including three virtual machines (102, 103, 104) executing on a set of one or more host computing devices (not illustrated). For purposes of this disclosure, the VMs may each execute on a different host computing device, or some or all of the VMs may execute on a shared host computing device. The VMs 102, 103, 104 of FIG. 1 are connected using a plurality of communications links 130A-130K and network devices 'A'-'G' (111, 112, 113, 114, 115, 115, 116). In some embodiments, each network device 111-117 is a separate physical device and each communications link 130A-130K is a separate physical communications link (e.g., a network cable such as Category 5 (Cat5) cable, twisted pair cable, coaxial cable, copper wire cable, other electrical cable, optical cable, power line, etc.), but in other embodiments one or more of the network devices 111-117 and/or communications links 130A-130K are virtualized (e.g. virtual network devices, virtual communications links).

A bandwidth request (e.g. 120) associated with each of the VMs is illustrated next to each communications link (130A, 130B, 130K) that is directly coupled to the virtual machines 102-104. In this embodiment, each bandwidth request 120 includes a required outbound bandwidth amount 121 representing a maximum amount of traffic that the first VM 101 will transmit into the multi-tenant cloud network 100 at any point in time, and also includes a required inbound bandwidth amount 122 representing a maximum amount of traffic that the first VM 101 will transmit into the multi-tenant cloud network 100 at any point in time. In this depicted embodiment, both the outbound bandwidth amount 121 and the inbound bandwidth amount 122 for the first VM 101 is the same (1 gigabit per second (Gbps)). In some embodiments (and possibly the depicted embodiment of FIG. 1), each of the outbound and inbound bandwidth amounts 121, 122 may be different, and in some embodiments there is only one bandwidth amount that is utilized as both the inbound and outbound bandwidth amounts 121, 122. In this example, the first VM 101 is to be provided 1 Gbps of bandwidth for each of inbound and outbound (or downstream/upstream, download/upload, transmit/receive, ingress/egress, etc.) traffic. Similarly, both the second VM 102 and the third VM 103 are each to be provided 2 Gbps of bandwidth for each of inbound and outbound traffic. In this description, unless indicated otherwise, the system determines bandwidth allocation with respect to the communication links that are not directly connected to a VM—i.e., communication links 130C-130J. However, in certain embodiments, these communication links 130A, 130B, 130K are also included as requiring bandwidth to be reserved, which is useful especially when a plurality of VMs execute on each host computing device and may share one communications link (e.g., 130K).

Figure 2:
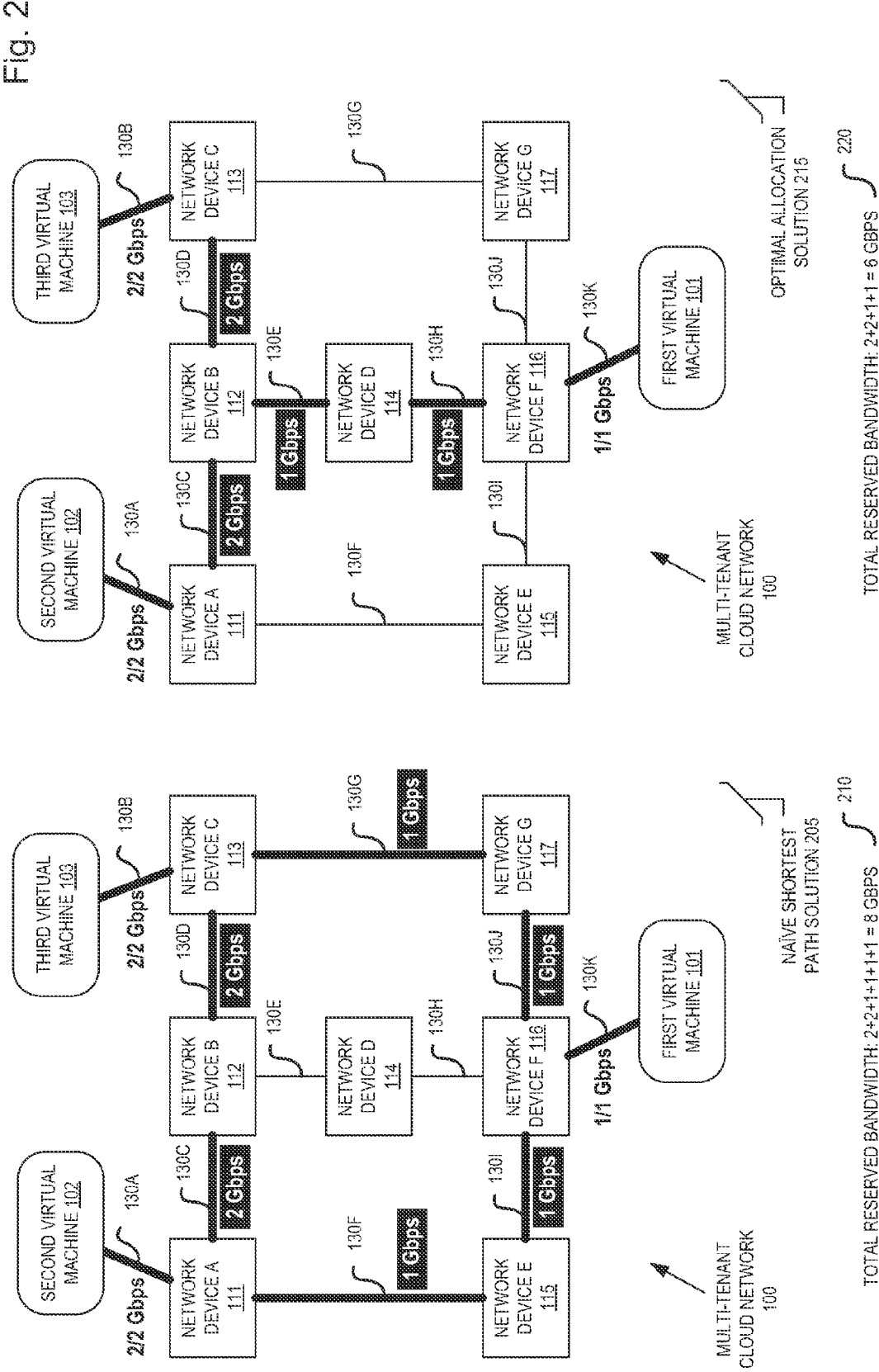
FIG. 2 illustrates, using the example cloud computing network topology of FIG. 1, a naïve shortest path based approach for bandwidth allocation according to one embodiment of the invention.

FIG. 2 illustrates, using the example cloud computing network topology of the multi-tenant cloud network 100 of FIG. 1, a naïve shortest path based approach for bandwidth allocation according to one embodiment of the invention. However, while such a naïve shortest path based approach will determine bandwidth amounts that will provide enough bandwidth for the VMs, this approach frequently results in an over-provisioning of bandwidth for the VMs. Accordingly, this naïve shortest path based approach will "waste" available bandwidth, reducing the number of tenants that may be served.

One approach for determining the bandwidth to be reserved on these communications links 130C-130 is to apply a well-known shortest path algorithm such as Dijkstra's algorithm to calculate shortest paths between each of the VMs 101-103. For example, a shortest path between the first VM 101 and the second VM 102 requires three "hops" and flows through network device A 111, network device E 115, and network device F 116. (Other paths through the multi-tenant cloud network 100 require more than three hops.) Then, each communication link on this path 130F, 130I will have an amount of bandwidth reserved that is equal to the maximum of:

$B_{2,1}$=min(required outbound bandwidth of second VM, required inbound bandwidth of first VM)
and
$B_{1,2}$=min(required outbound bandwidth of first VM, required inbound bandwidth of second VM)

In the depicted example, each link will have 1 Gbps reserved, which is the maximum of:
$B_{2,1}$=min(2 Gbps, 1 Gbps)=1 Gbps
and
$B_{1,2}$=min(1 Gbps, 2 Gbps)=1 Gbps Accordingly, maximum($B_{2,1}$, $B_{1,2}$)=maximum(1 Gbps, 1 Gbps)=1 Gbps; and 1 Gbps will be reserved on link 130B and link 130I for connections between the first VM 101 and the second VM 102.

Similarly, a shortest path is computed between the second VM 102 and the third VM 103, which travels through network device A 111, network device B 112, and network device C 113, and thus this path similarly requires three hops. Using the same bandwidth reservation calculation described above, both of links 130C and 130D will have 2 Gbps reserved for connections between the second VM 102 and the third VM 103. Finally, a shortest path between the third VM 103 and the first VM 101 will be computed as flowing through network device C 113, network device G 117, and network device F 116, which is also three hops. Accordingly, 1 Gbps of bandwidth will be allocated on links 130G and 130J for the connections between the third VM 103 and the first VM 101. At this point, the cloud network operator will configure the network 100 to utilize these paths between these three VMs 101-103, and will reserve these respective amounts of bandwidth on those links to ensure that the operator is meeting a SLA between the tenant and the operator.

From the standpoint of the cloud network operator, this naïve shortest path-based solution 205 requires a total of 8 Gbps of bandwidth 205 to be allocated/reserved for these three VMs of the tenant, as the sum of bandwidths from communication links 130C-130J equals 2+2+1+1+1+1=8 Gbps. While this solution does provide the necessary network bandwidth for the VMs of the tenant, it is not optimal as other configurations will yield a smaller overall amount of bandwidth being reserved in the network.

Instead, an optimal allocation solution 215 for the multi-tenant cloud network 100 does exist that requires the cloud network operator to only reserve a total of 6 Gbps of bandwidth to meet the SLA and service the three VMs 101-103 according to the required bandwidth amounts for each VM. For example, instead of having two distinct reserved paths between the first VM 101 and each of the other two VMs 102-103, an optimal allocation solution 215 is able to instead utilize communications links 130E and 130H, and share the already reserved bandwidth of links 130C and 130D. This optimization is made possible because of the requirement that the first VM 101 can only receive a total of 1 Gbps at any time; thus, since the first VM 101 cannot receive both 1 Gbps from the second VM 102 and the third VM 103 simultaneously, reserving bandwidth on two separate portions of the network (e.g., links 130F and 130I; and also links 130G and 130J) for the first VM 101 is unnecessary and inefficient. Similarly, because the second VM 102 can only receive 2 Gbps at a time, the second VM 102 cannot receive both 2 Gbps from the third VM 103 and 1 Gbps from the first VM 101 simultaneously. By exploiting this fact, the optimal allocation solution 215 can utilize shared communication links to both meet SLAs and reduce the total amount of reserved bandwidth in the network 100.

Thus, in the optimal allocation solution 215, the path between the second VM 102 and the third VM 103 remains the same, but the paths involving the first VM 101 will all run through communication links 130E and 130H. While these paths from the second VM 102 and the third VM 103 to the first VM 101 utilize a larger number of hops than the naïve shortest path based solution 105 (e.g., four hops each instead of three hops each), the total amount of reserved bandwidth in the network 100 is reduced—from 8 Gbps to 6 Gbps, as illustrated in computation 220.

Figure 3:
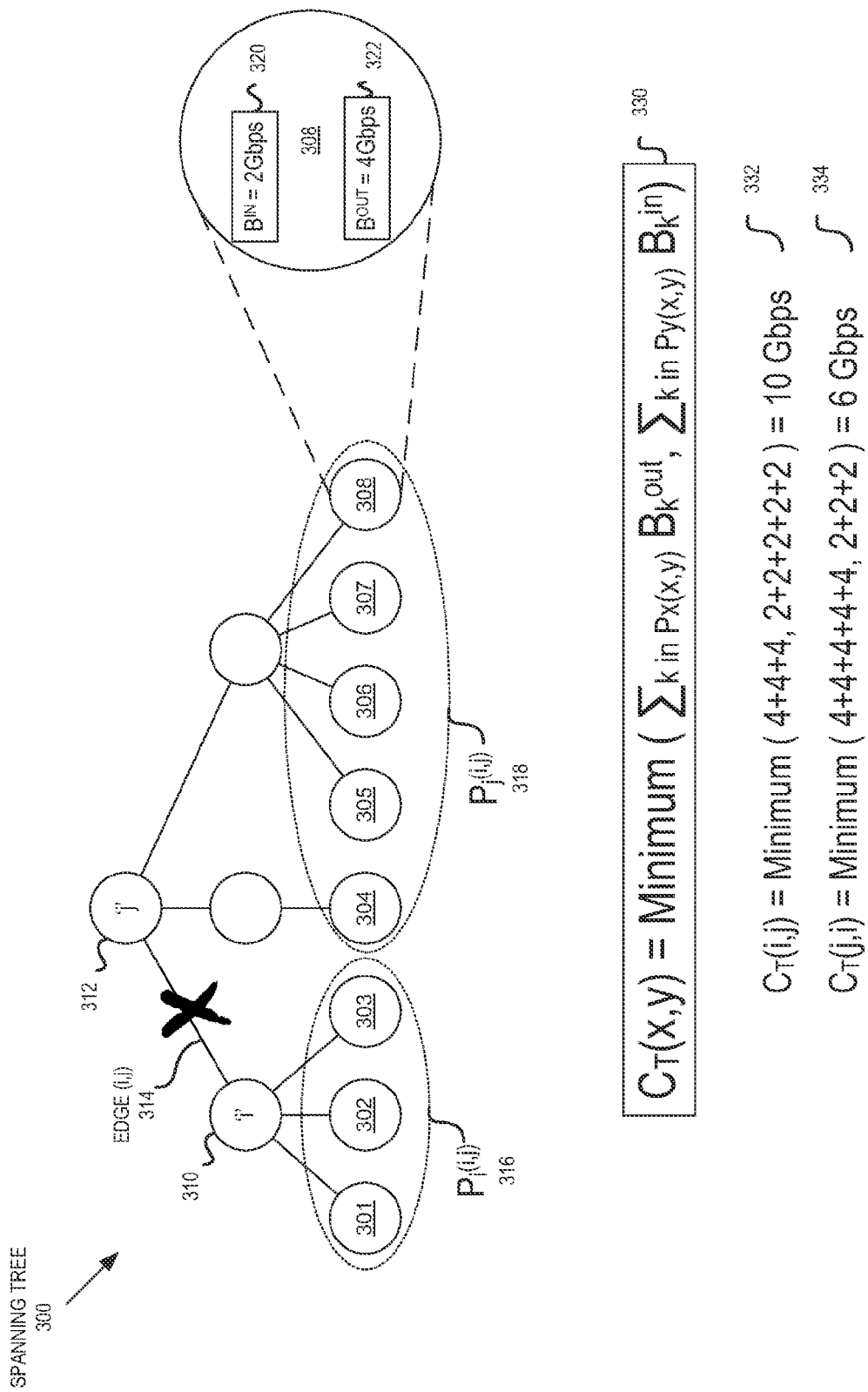
FIG. 3 illustrates the construction of a representative spanning tree and an equation for determining required bandwidth to be reserved on a network link according to one embodiment of the invention.

FIG. 3 illustrates the construction of a representative spanning tree 300 and an equation 330 for determining required bandwidth to be reserved on a network link according to one embodiment of the invention. According to an embodiment of the invention, a system is configured to determine the optimal bandwidth allocation 215 by constructing a plurality of such spanning trees 300 and calculating a required reserved bandwidth amount for each link in each of those trees. With this information, the "optimal" tree may be identified that maps to the optimal network allocation strategy given the tenant's bandwidth requirements. In various embodiments of the invention, this system can compute the optimal allocation strategy in all possible network topologies, including tree, fat-tree, B-Cube, D-cell, etc. Further, the system does not require an ability to "re-locate" the VMs in the network, and thus works with assigned VM locations to compute an optimal strategy for a system with those VM locations.

In an embodiment, the network is modeled as a graph G=(V, E), where V is a set of nodes and E is a set of bidirectional links between the nodes. In an embodiment of the invention, the nodes are one or more of the network devices in the network and the VMs in the network. For purposes of this discussion, the nodes include both the network devices and the VMs.

Each link (i, j) has associated bandwidth capacities in the two directions. The capacity from node i to node j is denoted by $L_{ij}$ and the capacity (in the opposite direction) from node j to node i is denoted by $L_{ji}$. The tenant specifies the set of VMs $P \subset V$ as well as their respective bandwidth requirements $B_i^{in}$ and $B_i^{out}$.

The system is configured to search for a best tree T that connects all the VMs in P. The system utilizes the tree structure as it is scalable to simplify routing and restoration. Also, the tree structure allows the bandwidth reserved on a link to be shared by the traffic between any two sets of VMs connected by the link. Thus, the bandwidth reserved on a link is equal to the maximum possible aggregate traffic between the two sets of VMs connected by the link.

To search for the optimal tree $T^{opt}$, the system first considers, for a tree T that interconnects all the VMs in P, the effect of removing links from the tree T. Thus, if a particular link (i,j) is removed in that tree T, the tree is partitioned into two parts: $P_i(i,j)$ and $P_j(i,j)$, the former including the set of VMs that are still connected to node i after link (i,j) is removed, and the later including the set of VMs that are still connected to node j after link (i,j) is removed. This analysis is depicted in FIG. 3 in the spanning tree 300, where the edge 314 represents a link (i,j) between a node i 310 and a node j 312 that is being "removed". In this scenario, $P_i(i,j)$, which represents the set of VMs that are still connected to node i after link (i,j) is removed, includes nodes 301, 302, and 303, which is illustrated by 316. Similarly, $P_j(i,j)$, which represents the set of VMs that are still connected to node j after link (i,j) is removed, includes nodes 304, 305, 306, 307, and 308, which is illustrated by 318.

Using this process, the bandwidth needed to be reserved on this "removed" link (i,j) based upon the flow of traffic from node i to node j is:

$$C_T(i,j) = \text{Minimum}(\Sigma_{k \, P^i(i,j)} B_k^{out}, \Sigma_{k \, in \, P^j(i,j)} B_k^{in})$$

which is represented in FIG. 3 as 330. Formula 330 is proper because the only traffic that traverses link (i, j) from node i to node j is the traffic originating from endpoints in $P_i(i,j)$ and directed towards endpoints in $P_j(i,j)$.

Thus, the total bandwidth reserved for tree T is given by:

$$C_T = \Sigma_{(i,j) \, in \, T} C_T(i,j)$$

From a high level, this process may be more formally defined as follows: given a set of VMs P, and their ingress and egress bandwidths, compute a tree T whose leaves are nodes in P and for which $C_T$ is minimum.

In the depicted embodiment of FIG. 3, assuming that each one of the nodes 301-308 includes an inbound bandwidth amount 320 of 2 Gbps and an outbound bandwidth amount 322 of 4 Gbps, then $C_T(i,j)$ is calculated 332 as a minimum of the outbound bandwidth amounts for nodes 301-303 (or 4+4+4 Gbps=12 Gbps) and the inbound bandwidth amounts for nodes 304-308 (or 2+2+2+2+2 Gbps=10 Gbps), which is 10 Gbps. Thus, node i 310 is configured to be able to transmit 10 Gbps of traffic over link 314 to node j 312 for these VMs. Similarly, $C_T(j,i)$ is calculated 334 as a minimum of the outbound bandwidth amounts for nodes 304-308 (or 4+4+4+4+4 Gbps=20 Gbps) and the inbound bandwidth amounts for nodes 301-303 (or 2+2+2 Gbps=6 Gbps), which is 6 Gbps. Thus, node j 312 is configured to be able to transmit 6 Gbps of traffic over link 314 to node i 310 for these VMs. In an embodiment, the minimum of $C_T(i,j)$ and $C_T(j,i)$ is used to indicate how much bandwidth must be reserved on the link represented by edge (i,j) 314.

In an embodiment of the invention, the system further considers the path lengths in the solution in addition to the amount of bandwidth needed to be reserved in each tree. In such embodiments, for a tree T and a node v in T, a weighted distance metric (see 402 of FIG. 4) is defined for a node v in T:

$$Q(T,v) = \Sigma_{k \, in \, P} B_k d(v,k)$$

Where $B_k$ represents the sum of reserved bandwidths between node v and the VM denoted as node k, and wherein d(v,k) is path length from node k to node v in the tree T (e.g., a number of hops in the tree).

Figure 4:
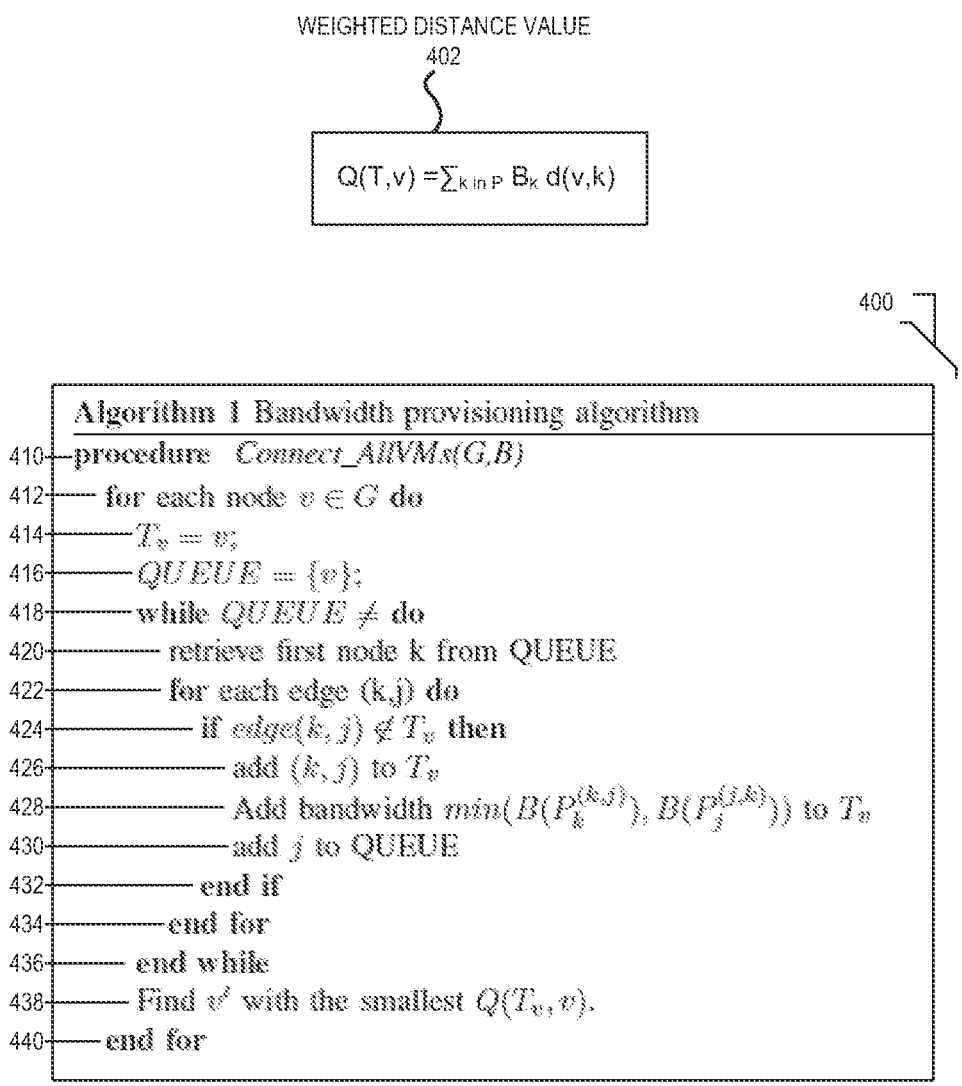
FIG. 4 illustrates a weighted distance value formula and an optimal network bandwidth provisioning algorithm according to one embodiment of the invention.

FIG. 4 illustrates a weighted distance value formula 402 and an optimal network bandwidth provisioning algorithm 400 to be used to determine and allocate an optimal network bandwidth amounts to service the VMs of a tenant according to one embodiment of the invention. In an embodiment of the invention, the algorithm 400, computes, for every node v (e.g., network device and/or VM) in the graph, a breadth first spanning tree rooted at that node v having the minimal possible $Q(T_v, v)$ value among all possible trees rooted at node v. In this embodiment, the constructed breadth first spanning tree (of all such constructed trees) having a smallest $Q(T_v, v)$ value is selected as the tree representing the optimal bandwidth allocation.

The algorithm, in the embodiment depicted in FIG. 4, includes a procedure at line 140 named Connect_AllVMs(G, B), which utilizes information from a graph G (including the nodes and edges as described above) and a set of bandwidth requirements B for the VMs.

The outermost "for each" loop at line 412 indicates that the following instructions (that construct a breadth first spanning tree rooted at a node v) are performed for each node in the graph G. At 414, an empty tree $T_v$ is set to include the current node v as the root node. At 416, a QUEUE is declared as a set that includes node v.

At 416, a "while" loop executes while the QUEUE is non-empty. First, at 420, the first node in the QUEUE is retrieved and deemed node k. At 422, another "for each" loop is executed that iterates through each edge in the graph connected to node k. At 424, if a current edge connecting node k to a node j is not in the tree $T_v$, three actions occur. First, at 426, the edge (k, j) is added to tree $T_v$. Next, at 428, a bandwidth value is associated with the edge. In an embodiment, this bandwidth value is the minimum of $C_T(k,j)$ and $C_T(j,k)$, as described above. Next, at 430, the node j at the other end of edge (k, j) is added to the front of the QUEUE. At 432, the three actions have completed, and at 434 the process of examining edge (k, j) has completed, so the process iterates through steps 424-434 for every other edge connected to node k. At 436, the "while" loop completes, and all nodes in the graph G have been processed and now exist in the tree $T_v$. At this point, in an embodiment of the invention, at 438 a weighted distance metric value (see 402 and discussion above) is calculated for this constructed tree. If this weighted distance metric value is smaller than any other calculated weighted distance metric value for earlier constructed trees (i.e., from earlier iterations of the "for each" loop at step 412), then a pointer to the current "best scoring" tree is maintained as v'. Finally, at 440, the process completes, and the tree identified by v' is the tree having the network bandwidth allocation representing the optimal bandwidth allocation.

Figure 5:
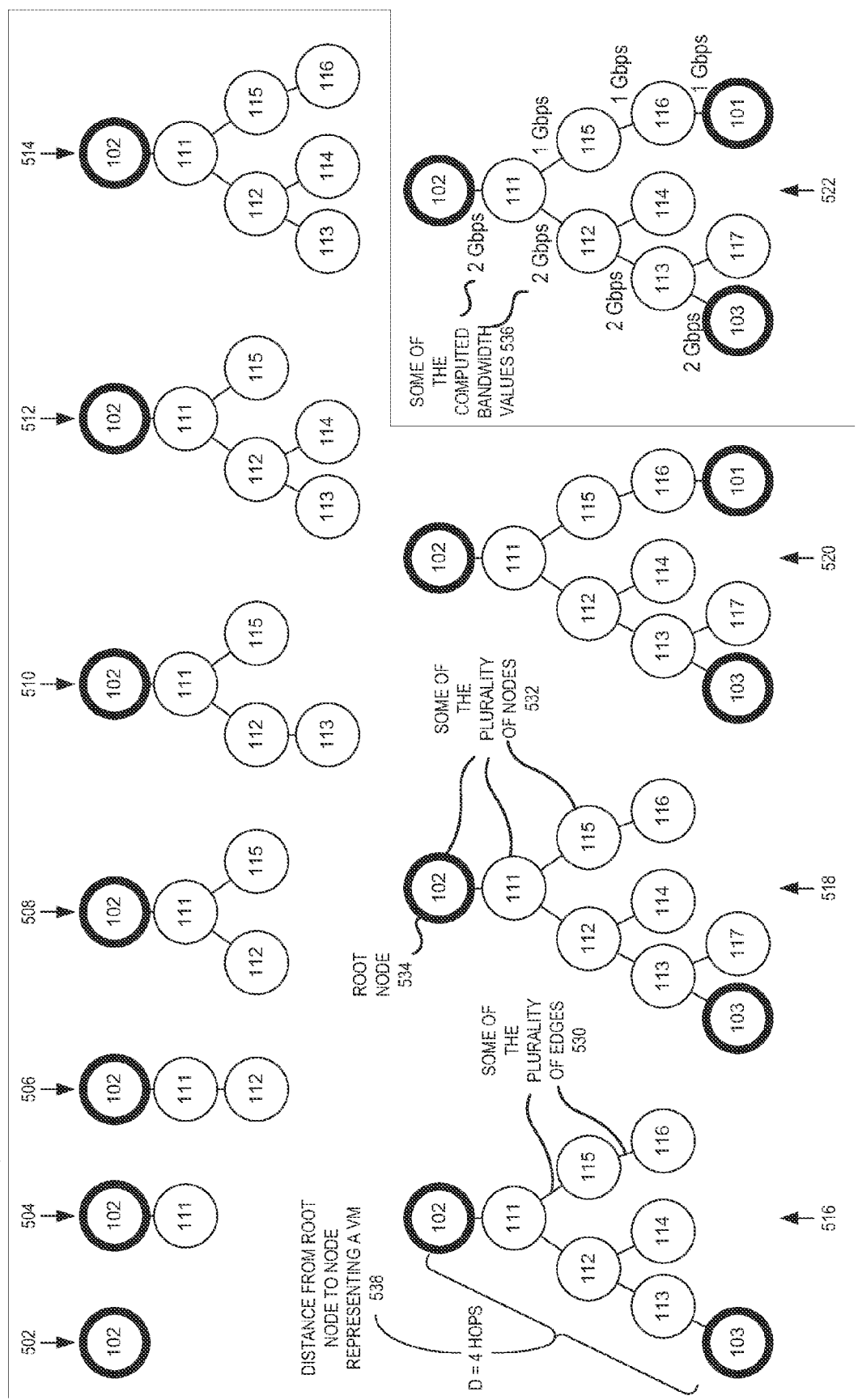
FIG. 5 illustrates the construction of a breadth-first spanning tree using the second virtual machine of FIG. 1 as a root node in the tree according to one embodiment of the invention.

FIG. 5 illustrates the construction 500 of a breadth-first spanning tree using the second virtual machine 102 of FIG. 1 as a root node in the tree, and the network topography of FIG. 1, according to one embodiment of the invention. This figure illustrates one execution of the bandwidth provisioning algorithm 400 from lines 414-438; thus, given a selected node, a breadth first spanning tree is constructed and a weighted distance value 402 is computed. In this depiction, nodes representing VMs have thick borders; nodes representing network devices have thin borders. Further, while in this embodiment the reserved bandwidth for each edge representing a link is calculated while adding each edge to the tree (see steps 424-432 of FIG. 4), these reserved bandwidths are not illustrated for the sake of clarity.

A breadth-first construction of a tree works by adding nodes to a tree using a level-by-level approach. Given a root node (e.g., at level 0), all nodes directly connected to the root node are added in a "level 1." Then, all nodes directly connected to the nodes of "level 1" are added as a "level 2", and so on. Thus, one level at a time is constructed in the tree. Breadth-first tree traversals differ from depth-first tree traversals, which operate by moving deeper and deeper into a tree (i.e., into deeper levels) before other "sibling" nodes in any particular level are visited.

At 502, the first selected node (here representing VM 102) is added to the tree ($T_v$). At 504, a first edge and node 111 is added to the tree. As presented in FIG. 1, VM 102 is only directly connected to one other VM or network device (i.e., network device A 111), and during its processing, the nodes for network devices B 112 and E 115 are added to the QUEUE to be processed next because these network devices 112, 115 are directly connected to network device A 111.

At 506 and 508, these nodes 112 and 115 are added to the tree. Continuing in a breadth first manner, nodes 113, 114, and 116 are added in steps 510, 512, and 514. The process continues at 516, 518, and 520 by adding nodes representing the third VM 103, network device G 117, and the first VM 101, respectively. At this point, all of the nodes in the graph have been added to the tree, and each of the links includes a computed bandwidth value as described above. This constructed tree includes the root node 534 representing the second VM 102, a plurality of nodes (see, e.g., 532), and a plurality of edges (see, e.g., 530). Further, a distance 538 may be calculated between nodes, which in an embodiment is a number of hops between the nodes in the tree.

At 522, the computed bandwidth values are displayed, and a weighted distance value 402 is computed as described above using the root node as node v. For example, in the depicted embodiment of FIG. 5, the weighted distance value 402 may equal:

$$Q(T,v)=\Sigma_{k\ in\ P}B_k d(v,k)$$

$$Q(T,v)=(0)(0\ \text{hops to node}\ 102)+(2+2+2+2)(4\ \text{hops to node}\ 103)+(2+1+1+1)(4\ \text{hops to node}\ 101)$$

$$Q(T,v)=0+32+20=52$$

Thus, the weighted distance value 402 for this constructed tree is "52". If this weighted distance value 402 is smaller than the weighted distance value 402 for each other such constructed tree using the other nodes of the graph as the root node, then this tree will represent the optimal bandwidth allocation amounts and respective links to service the set of VMs 101-103.

In this example, the calculation of the weighted distance values 402 includes using the bandwidth value of the links directly connecting a node representing a VM (e.g., nodes for 101, 102, 103) and another node. In some embodiments, these bandwidth values are excluded from the calculation.

Figure 6:
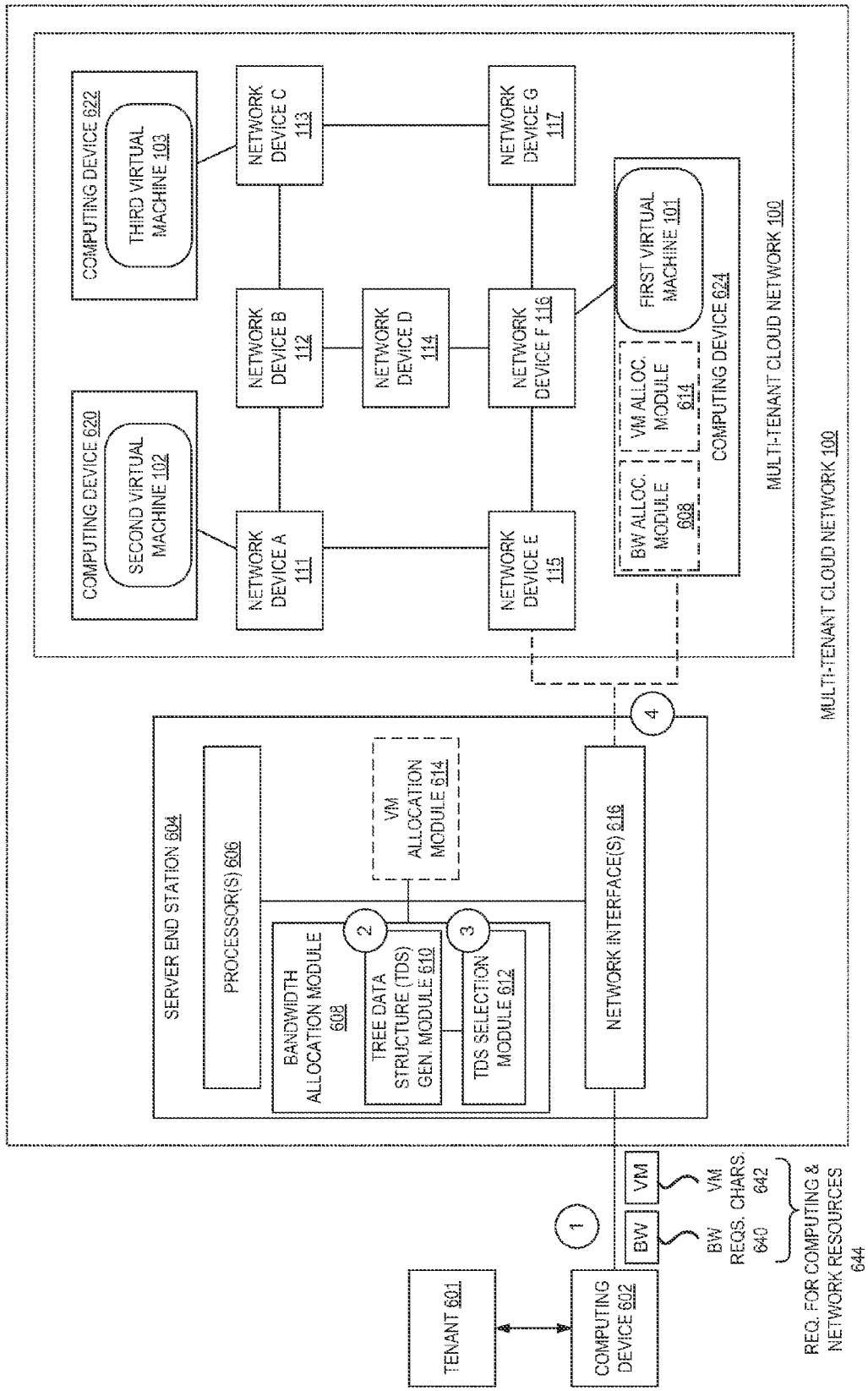
FIG. 6 illustrates a block diagram of a multi-tenant cloud network utilizing an optimal network bandwidth allocation system according to one embodiment of the invention.

FIG. 6 illustrates a block diagram of a multi-tenant cloud network 100 utilizing an optimal network bandwidth allocation system according to one embodiment of the invention. In this illustrated embodiment, the multi-tenant cloud network 100 includes the network devices A-G 111-117 and the three VMs 101-103 of FIG. 1. The three VMs 102, 103, 101 each execute on a respective computing device 620, 622, 624. A server end station 604 is also depicted, which may exist within the multi-tenant cloud network 100 or external to the multi-tenant cloud network 100.

At circle '1', a computing device 602 of a tenant 601 transmits a request for computing and network resources 644 to the server end station 604. In an embodiment, the request for computing and network resources 644 includes one or more messages indicating virtual machine characteristics 642 requested by the tenant and one or more messages indicating bandwidth requirements 640 for those virtual machines. In a different embodiment, the VM characteristics 642 and bandwidth requirements 640 are transmitted within one message, but in other embodiments this data is transmitted in various groupings using one or more messages. For example, a set of characteristics for a VM and the associated bandwidth requirements for that VM may be included within one message.

The request for computing and network resources 644 arrives at a set of one or more network interfaces 616 of the server end station 604. The set of network interfaces, which allow the server end station 604 to both transmit and receive network traffic, are coupled to a set of one or more processors 606, a bandwidth allocation module 608, and optionally to a virtual memory allocation module 614.

At circle '2', the request for computing and network resources 644 (or a portion thereof) is provided to a tree data structure (TDS) generation module 610 of the bandwidth allocation module 608. (In some embodiments, the bandwidth allocation module 608 is located within one of the host computing devices (e.g., computing device 624) of the multi-tenant cloud network 100.

The TDS generation module 610, using one or more of the request for computing and network resources 644 and a representation of a topography and capabilities of the multi-tenant cloud network 100, constructs a plurality of tree data structures representing different bandwidth allocation schemes possible to meet the bandwidth requirements of the request for computing and network resources 644. At circle '3', a tree data structure selection module 612 of the bandwidth allocation module 608 selects one TDS of the plurality of constructed TDSs allowing the bandwidth requirements of the request for computing and network resources 644 to be met using a minimal amount of allocated bandwidth in the multi-tenant cloud network 100. In an embodiment, the TDS generation module 610 and the TDS selection module 612 implement the bandwidth provisioning algorithm 400 of FIG. 4.

At circle '4', a virtual machine allocation module 614 (located in the server end station 604 or in one of the host computing devices 620, 622, 624 of the multi-tenant cloud network 100), using the selected TDS (or data based upon values from the selected TDS, such as but not limited to communication link identifiers and/or network device identifiers) is operable to configure the multi-tenant cloud network 100 to utilize the determined allocated bandwidth amounts for the VMs. In an embodiment, the VM allocation module 614 is operable to install forwarding information in one or more of the network devices 111-117 to cause the traffic of the VMs 101-103 to be transmitted over the routes identified by the selected TDS, and is further operable to cause the one or more of the network devices 111-117 to "reserve" or allocate bandwidth on one or more communication links (e.g., at particular physical network interface(s)) for the traffic of the VMs 101-103. The VM allocation module 614 is further operable to, in some embodiments, cause the VMs 101-103 to be instantiated on the one or more computing devices 620, 622, 624 according to the request for computing and network resources 644. In some of these embodiments, the VM allocation module 614 comprises a VM hypervisor.

Figure 7:
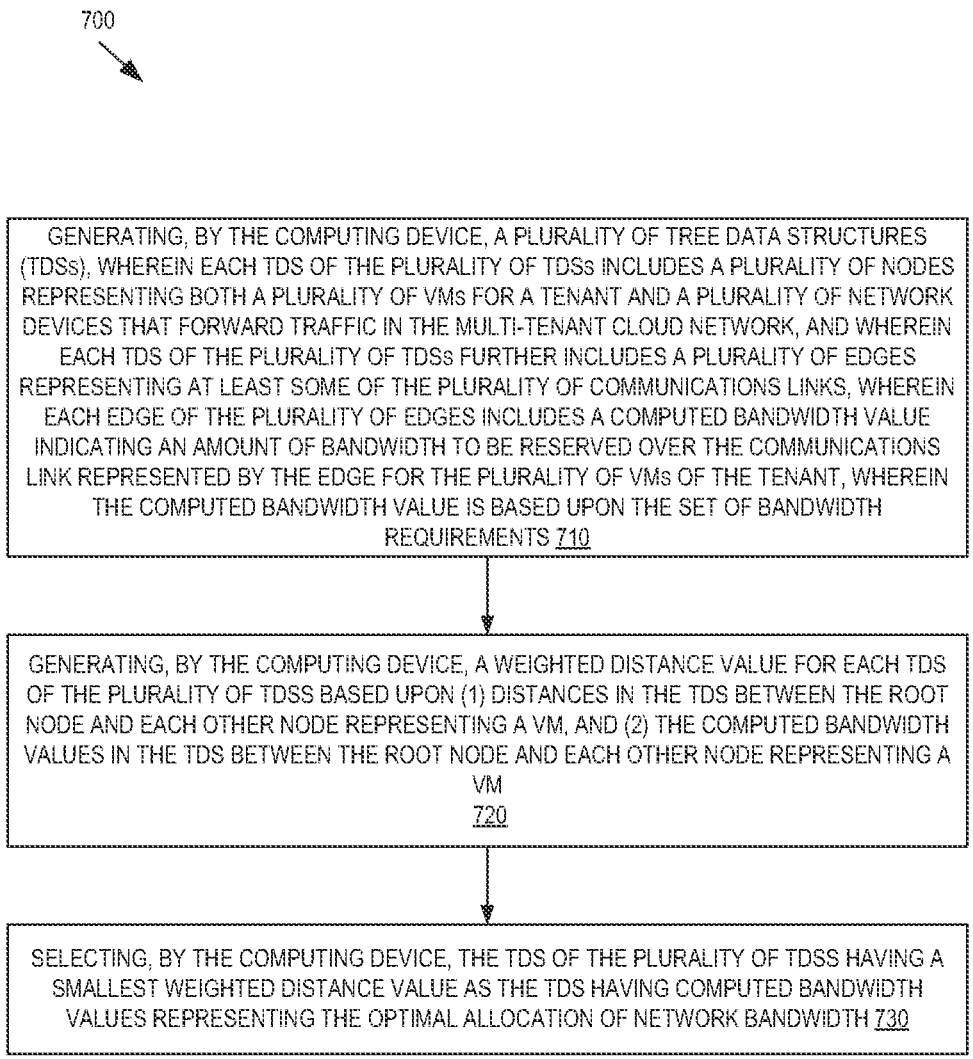
FIG. 7 illustrates a flow for determining an optimal allocation of network bandwidth on a plurality of communications links for a plurality of virtual machines in a multi-tenant cloud network based upon a set of bandwidth requirements for the plurality of VMs according to one embodiment of the invention.

FIG. 7 illustrates a flow 700 for determining an optimal allocation of network bandwidth on a plurality of communications links for a plurality of virtual machines in a multi-tenant cloud network based upon a set of bandwidth requirements for the plurality of VMs according to one embodiment of the invention.

The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

At 710, the flow 700 includes generating, by the computing device, a plurality of tree data structures. Each TDS of the plurality of TDSs includes a plurality of nodes representing both the plurality of VMs and a plurality of network devices that forward traffic in the multi-tenant cloud network. Each TDS of the plurality of TDSs further includes a plurality of edges representing at least some of the plurality of communications links. Each edge of the plurality of edges includes a computed bandwidth value indicating an amount of bandwidth to be reserved over the communications link represented by the edge. The computed bandwidth value is based upon the set of bandwidth requirements. In an embodiment, each of the plurality of TDSs are spanning trees generated using breadth-first algorithms. In an embodiment, the set of bandwidth requirements includes, for each VM of the plurality of VMs, a required outbound bandwidth to be provided to the VM indicating a traffic rate that the VM must be able to transmit. In an embodiment, the set of bandwidth requirements includes, for each VM of the plurality of VMs, a required inbound bandwidth to be provided to the VM indicating a traffic rate that the VM must be able to receive.

In an embodiment, the computed bandwidth value for a particular edge in a TDS is a minimum of two values. The first value is a sum of all outbound bandwidths, of the set of bandwidth requirements, required for those VMs of the plurality of VMs having representative nodes in a first partition of one or more nodes, wherein the first partition of nodes is a first set of one or more nodes of the plurality of nodes in the spanning tree that remain connected when the edge is removed from the spanning tree. The second value is a sum of all inbound bandwidths, of the set of bandwidth requirements, required for those VMs of the plurality of VMs having representative nodes in a second partition of one or more nodes, wherein the second partition of nodes is a second set of one or more nodes of the plurality of nodes in the spanning tree that remain connected when the edge is removed from the spanning tree.

At 720, the flow 700 includes generating, by the computing device, a weighted distance value for each TDS of the plurality of TDSs. This generating is based upon (1) distances in the TDS between the root node and each other node representing a VM, and (2) the computed bandwidth values in the TDS between the root node and each other node representing a VM. At 730, the flow 700 includes selecting, by the computing device, the TDS of the plurality of TDSs having a smallest weighted distance value as the TDS having computed bandwidth values representing the optimal allocation of network bandwidth.

Figure 8:
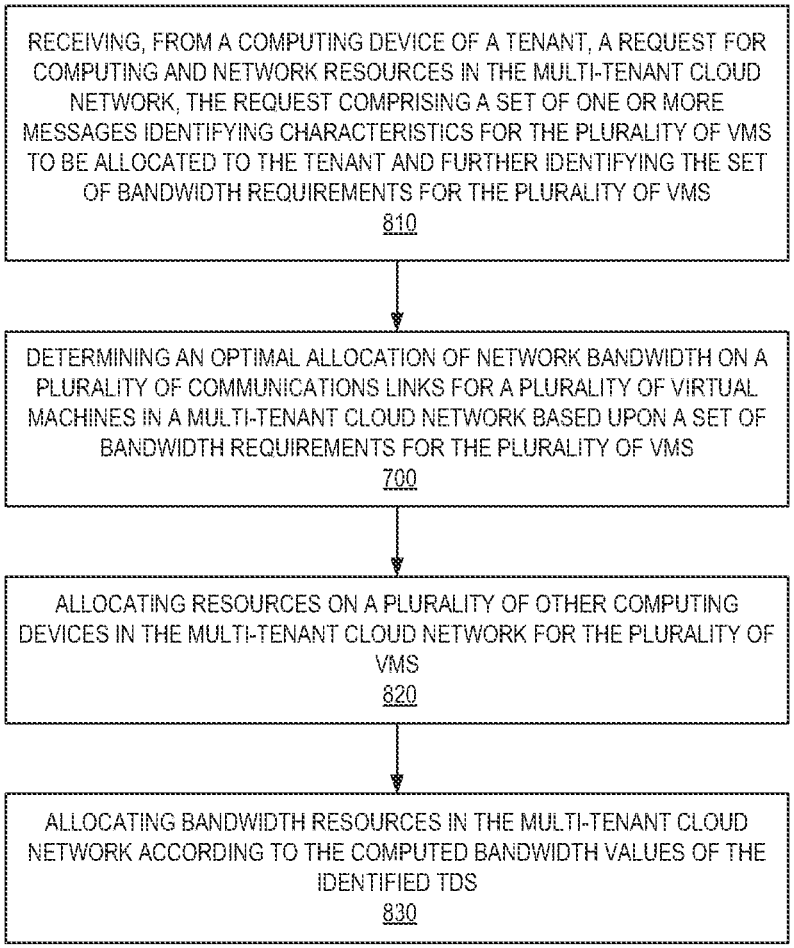
FIG. 8 illustrates a flow performed in a server end station of a cloud provider for determining and allocating network bandwidth requirements according to one embodiment of the invention.

FIG. 8 illustrates a flow 800 performed in a server end station of a cloud provider for determining and allocating network bandwidth requirements according to one embodiment of the invention.

At 810, the flow 800 includes receiving, from a computing device of a tenant, a request for computing and network resources in the multi-tenant cloud network. The request includes a set of one or more messages identifying characteristics for the plurality of VMs to be allocated to the tenant (e.g., locations in the multi-tenant cloud network where the VM should execute, storage requirements of the VM, processing requirements of the VM, memory requirements of the VM, etc.), and further identifying a set of bandwidth requirements for the plurality of VMs.

Then, at 700, the flow 800 includes determining an optimal allocation of network bandwidth on a plurality of communications links for a plurality of VMs in a multi-tenant cloud network based upon a set of bandwidth requirements for the plurality of VMs. In an embodiment, box 700 represents steps 710, 720, and 730 of FIG. 7.

At 820, the flow 800 includes allocating resources on a plurality of other computing devices in the multi-tenant cloud network for the plurality of VMs. In an embodiment, each of the plurality of VMs executes on a separate computing device, but in other embodiments two or more of the plurality of VMs execute on a single computing device. In some embodiments, there are one or more other VMs belonging to other tenants executing on one or more of the other computing devices.

At 830, the flow 800 includes allocating bandwidth resources in the multi-tenant cloud network according to the computed bandwidth values of the identified TDS. In an embodiment, steps 820 and 830 are combined into one step and may be implemented with one action.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a computing device for determining an optimal allocation of network bandwidth on a plurality of communications links for connecting a plurality of virtual machines (VMs) of a tenant in a multi-tenant cloud network based upon a set of bandwidth requirements for the plurality of VMs, the method comprising:
   generating, by the computing device, a plurality of tree data structures (TDSs), wherein each TDS of the plurality of TDSs includes a plurality of nodes representing both the plurality of VMs and a plurality of network devices that forward traffic in the multi-tenant cloud network, and wherein each TDS of the plurality of TDSs further includes a plurality of edges representing at least some of the plurality of communications links, wherein each edge of the plurality of edges includes a computed bandwidth value indicating an amount of bandwidth to be reserved over the communications link represented by the edge for the plurality of VMs of the tenant, wherein the computed bandwidth value is based upon the set of bandwidth requirements;
   generating, by the computing device, a weighted distance value for each TDS of the plurality of TDSs based upon,
      distances in the TDS between a root node and each other node representing a VM, and
      the computed bandwidth values in the TDS between the root node and each other node representing a VM; and
   selecting, by the computing device, the TDS of the plurality of TDSs having a smallest weighted distance value as the TDS having computed bandwidth values representing the optimal allocation of network bandwidth.

2. The method of claim 1, wherein each TDS of the plurality of TDSs is a spanning tree.

3. The method of claim 2, wherein the set of bandwidth requirements includes, for each VM of the plurality of VMs, a required outbound bandwidth to be provided to the VM indicating a traffic rate that the VM must be able to transmit.

4. The method of claim 3, wherein the set of bandwidth requirements further includes, for each VM of the plurality of VMs, a required inbound bandwidth to be provided to the VM indicating a traffic rate that the VM must be able to receive.

5. The method of claim 4, wherein said computed bandwidth value for an edge is a minimum of:
   a sum of all outbound bandwidths, of the set of bandwidth requirements, required for those VMs of the plurality of VMs having representative nodes in a first partition of one or more nodes, wherein the first partition of nodes is a first set of one or more nodes of the plurality of nodes in the spanning tree that remain connected when the edge is removed from the spanning tree; and
   a sum of all inbound bandwidths, of the set of bandwidth requirements, required for those VMs of the plurality of VMs having representative nodes in a second partition of one or more nodes, wherein the second partition of nodes is a second set of one or more nodes of the plurality of nodes in the spanning tree that remain connected when the edge is removed from the spanning tree.

6. The method of claim 1, wherein each TDS of the plurality of TDSs is generated using a breadth first spanning tree algorithm.

7. The method of claim 1, wherein the set of bandwidth requirements includes, for each VM of the plurality of VMs, only one required outbound bandwidth for all outgoing communications and only one required inbound bandwidth for all incoming communications.

8. The method of claim 1, further comprising:
receiving, from a computing device of a tenant, a request for computing and network resources in the multi-tenant cloud network for the tenant, the request comprising a set of one or more messages identifying characteristics for the plurality of VMs to be allocated to the tenant and further identifying the set of bandwidth requirements for the plurality of VMs.

9. The method of claim 8, further comprising:
allocating resources on a plurality of other computing devices in the multi-tenant cloud network for the plurality of VMs; and
allocating bandwidth resources in the multi-tenant cloud network according to the computed bandwidth values of the identified TDS.

10. A server end station to determine an optimal allocation of network bandwidth on a plurality of communications links for connecting a plurality of virtual machines (VMs) of a tenant in a multi-tenant cloud network based upon a set of bandwidth requirements for the plurality of VMs, the server end station comprising:
a set of one or more processors;
a tree data structure (TDS) generation module coupled to the set of processors and configured to,
generate a plurality of TDSs, wherein each TDS of the plurality of TDSs is to include a plurality of nodes representing both the plurality of VMs and a plurality of network devices that forward traffic in the multi-tenant cloud network, and wherein each TDS of the plurality of TDSs is further to include a plurality of edges representing at least some of the plurality of communications links, wherein each edge of the plurality of edges is to include a computed bandwidth value indicating an amount of bandwidth to be reserved over the communications link represented by the edge for the plurality of VMs of the tenant, wherein the computed bandwidth value is to be based upon the set of bandwidth requirements, and
generate a weighted distance value for each TDS of the plurality of TDSs based upon,
distances in the TDS between a root node and each other node representing a VM, and
the computed bandwidth values in the TDS between the root node and each other node representing a VM; and
a TDS selection module coupled to the set of processors and configured to select the TDS of the plurality of TDSs having a smallest weighted distance value as the TDS having computed bandwidth values representing the optimal allocation of network bandwidth.

11. The server end station of claim 10, wherein each TDS of the plurality of TDSs is a spanning tree.

12. The server end station of claim 11, wherein the set of bandwidth requirements is to include, for each VM of the plurality of VMs, a required outbound bandwidth to be provided to the VM indicating a traffic rate that the VM must be able to transmit.

13. The server end station of claim 12, wherein the set of bandwidth requirements is further to include, for each VM of the plurality of VMs, a required inbound bandwidth to be provided to the VM indicating a traffic rate that the VM must be able to receive.

14. The server end station of claim 13, wherein said computed bandwidth value for an edge is a minimum of:
a sum of all outbound bandwidths, of the set of bandwidth requirements, required for those VMs of the plurality of VMs having representative nodes in a first partition of one or more nodes, wherein the first partition of nodes is a first set of one or more nodes of the plurality of nodes in the spanning tree that remain connected when the edge is removed from the spanning tree; and
a sum of all inbound bandwidths, of the set of bandwidth requirements, required for those VMs of the plurality of VMs having representative nodes in a second partition of one or more nodes, wherein the second partition of nodes is a second set of one or more nodes of the plurality of nodes in the spanning tree that remain connected when the edge is removed from the spanning tree.

15. The server end station of claim 10, further comprising:
a set of one or more network interfaces coupled to the set of processors and configured to receive, from a computing device of a tenant, a request for computing and network resources in the multi-tenant cloud network for the tenant, the request comprising a set of one or more messages identifying characteristics for the plurality of VMs to be allocated to the tenant and further identifying the set of bandwidth requirements for the plurality of VMs.

16. The server end station of claim 15, wherein the set of network interfaces are further configured to:
transmit a second set of one or more messages to,
allocate resources on a plurality of other computing devices in the multi-tenant cloud network for the plurality of VMs, and
allocate bandwidth resources in the multi-tenant cloud network according to the computed bandwidth values of the identified TDS.

17. A non-transitory computer-readable storage medium that provides instructions which, when executed by a set of one or more processors of a computing device, cause the computing device to determine an optimal allocation of network bandwidth on a plurality of communications links for connecting a plurality of virtual machines (VMs) of a tenant in a multi-tenant cloud network based upon a set of bandwidth requirements for the plurality of VMs by performing operations comprising:
generating, by the computing device, a plurality of tree data structures (TDSs), wherein each TDS of the plurality of TDSs includes a plurality of nodes representing both the plurality of VMs and a plurality of network devices that forward traffic in the multi-tenant cloud network, and wherein each TDS of the plurality of TDSs further includes a plurality of edges representing at least some of the plurality of communications links, wherein each edge of the plurality of edges includes a computed bandwidth value indicating an amount of bandwidth to be reserved over the communications link represented by the edge for the plurality of VMs of the tenant, wherein the computed bandwidth value is based upon the set of bandwidth requirements;
generating, by the computing device, a weighted distance value for each TDS of the plurality of TDSs based upon, distances in the TDS between a root node and each other node representing a VM, and the computed bandwidth values in the TDS between the root node and each other node representing a VM; and selecting, by the computing device, the TDS of the plurality of TDSs having a smallest weighted distance value as the TDS having computed bandwidth values representing the optimal allocation of network bandwidth.

18. The non-transitory computer-readable storage medium of claim 17, wherein the set of bandwidth requirements includes, for each VM of the plurality of VMs:

a required outbound bandwidth to be provided to the VM indicating a traffic rate that the VM must be able to transmit; and a required inbound bandwidth to be provided to the VM indicating a traffic rate that the VM must be able to receive.

19. The non-transitory computer-readable storage medium of claim 18, wherein said computed bandwidth value for an edge is a minimum of:

a sum of all outbound bandwidths, of the set of bandwidth requirements, required for those VMs of the plurality of VMs having representative nodes in a first partition of one or more nodes, wherein the first partition of nodes is a first set of one or more nodes of the plurality of nodes in the spanning tree that remain connected when the edge is removed from the spanning tree; and a sum of all inbound bandwidths, of the set of bandwidth requirements, required for those VMs of the plurality of VMs having representative nodes in a second partition of one or more nodes, wherein the second partition of nodes is a second set of one or more nodes of the plurality of nodes in the spanning tree that remain connected when the edge is removed from the spanning tree.

20. The non-transitory computer-readable storage medium of claim 17, wherein the operations further comprise:

receiving, from a computing device of a tenant, a request for computing and network resources in the multi-tenant cloud network for the tenant, the request comprising a set of one or more messages identifying characteristics for the plurality of VMs to be allocated to the tenant and further identifying the set of bandwidth requirements for the plurality of VMs;

allocating resources on a plurality of other computing devices in the multi-tenant cloud network for the plurality of VMs; and allocating bandwidth resources in the multi-tenant cloud network according to the computed bandwidth values of the identified TDS.

* * * * *

UNITED STATES PATENT AND TRADEMARK OFFICE
CERTIFICATE OF CORRECTION

PATENT NO.        : 9,065,734 B2                          Page 1 of 1
APPLICATION NO.   : 13/791316
DATED             : June 23, 2015
INVENTOR(S)       : Zhang It is certified that error appears in the above-identified patent and that said Letters Patent is hereby corrected as shown below:

In Column 11, Line 4, delete " $C_T(i,j) = \text{Minimum}(\Sigma_k P^i_{(i,j)} B_k^{out}, \Sigma_{k\,in} P^{(i,j)} B_k^{in})$ " and insert -- $C_T(i,j) = \text{Minimum}(\Sigma_{k\,in\,P_i(i,j)} B_k^{out}, \Sigma_{k\,in\,P_j(i,j)} B_k^{in})$ --, therefor.

In Column 12, Line 10, delete "tree T$_V$" and insert -- tree T$_V$. --, therefor.

Signed and Sealed this
Fifth Day of January, 2016

Michelle K. Lee
*Director of the United States Patent and Trademark Office*